United States Patent
Teng

(10) Patent No.: US 9,388,318 B2
(45) Date of Patent: Jul. 12, 2016

(54) THERMOSETTING COMPOSITION

(75) Inventor: Li-Sheng Teng, New Taipei (TW)

(73) Assignee: WISTRON CORP., New Taipei (TW)

( * ) Notice: Subject to any disclaimer, the term of this patent is extended or adjusted under 35 U.S.C. 154(b) by 1162 days.

(21) Appl. No.: 13/335,075

(22) Filed: Dec. 22, 2011

(65) Prior Publication Data

US 2013/0029044 A1    Jan. 31, 2013

(30) Foreign Application Priority Data

Jul. 27, 2011 (TW) .................................. 100126548

(51) Int. Cl.
*C09D 11/52* (2014.01)
*H01B 1/00* (2006.01)
*C09D 11/10* (2014.01)
*C09D 5/24* (2006.01)
*C09D 7/12* (2006.01)
*H01B 1/12* (2006.01)

(52) U.S. Cl.
CPC *C09D 11/10* (2013.01); *C09D 5/24* (2013.01); *C09D 7/1283* (2013.01); *C09D 11/52* (2013.01)

(58) Field of Classification Search
CPC ............ B05D 1/00; H01B 1/12; C09D 11/10; C09D 11/52; C09D 5/24; C09D 7/1283
USPC ............................... 427/526; 252/519.33, 512
See application file for complete search history.

(56) References Cited

U.S. PATENT DOCUMENTS

| 6,721,908 | B1 | 4/2004 | Kim et al. | |
|---|---|---|---|---|
| 2008/0022898 | A1* | 1/2008 | Sudo et al. | 106/287.25 |
| 2010/0063203 | A1* | 3/2010 | Sato | C09B 67/0008 524/599 |

FOREIGN PATENT DOCUMENTS

| CN | 1450137 | | 10/2003 |
|---|---|---|---|
| CN | 1297617 | | 1/2007 |
| CN | 101538432 | | 9/2009 |
| CN | 101538432 A | * | 9/2009 |
| CN | 101845258 | | 9/2010 |
| TW | 200927861 | | 7/2009 |
| TW | 200927861 A | * | 7/2009 |

OTHER PUBLICATIONS

Chinese language office action dated Dec. 23, 2013.
English language translation of relevant paragraphs of Chinese Office Action.
English language translation of CN 1450137 (published Oct. 22, 2003).
English language translation of CN 101538432 (published Sep. 23, 2009).
Taiwanese language office action dated Feb. 27, 2014.
English language translation of relevant paragraphs of Taiwanese language office action.
English language translation of CN 1297617 (published Jan. 31, 2007).
Taiwanese language office action dated Nov. 11, 2013, and English language translation of relevant paragraphs.
English language translation of TW 200927861 (published Jul. 1, 2009).
Taiwanese language office action dated May 30, 2014.
English language translation of relevant paragraphs of Taiwan office action.
English language translation of CN 101845258 (published Sep. 29, 2010).

\* cited by examiner

*Primary Examiner* — Mark Kopec
*Assistant Examiner* — Danny N Kang
(74) *Attorney, Agent, or Firm* — McClure, Qualey & Rodack, LLP

(57) ABSTRACT

The invention provides a single liquid oil and method for fabricating the same, and method for forming a thin film. The single liquid oil includes: 60-80 parts by weight of an waterborne acrylic resin; 3-10 parts by weight of a metal pigment; 0.5-3 parts by weight of an auxiliary agent; 5-12 parts by weight of an organic solvent; and 15-25 parts by weight of water.

15 Claims, No Drawings

THERMOSETTING COMPOSITION

CROSS REFERENCE TO RELATED APPLICATIONS

This Application claims priority of Taiwan Patent Application No.100126548, filed on Jul. 27, 2011, the entirety of which is incorporated by reference herein.

BACKGROUND OF THE INVENTION

1. Field of the Invention

The present invention relates to an oil, and in particular relates to a single liquid oil and method for fabricating the same.

2. Description of the Related Art

Consumer electronic applications are becoming increasingly diverse with the rapid progress of science and technology. In various electronic products, touch panels are widely used, such as for portable electronic products (such as personal digital assistant (PDA) or mobile phone).

The border of the touch panel is usually treated to form a metallic film on the surface of the border. The metallic film is required to meet the requirements of the low conductivity (electrical conductivity must be less than 200 mV) to avoid failure of the touch function. Currently, the metallic film is formed by a non conductive vacuum metallization (NCVM) process. However, the NCVM process has high equipment costs and there are many restrictions in fabrication steps such as the adhesive or assembly steps.

In order to solve the problems, the invention provides an oil and the oil is printed on the surface of the border of the touch panel to form a thin film on the border. The thin film not only has a metallic appearance but also has low conductivity.

BRIEF SUMMARY OF THE INVENTION

The invention provides a single liquid oil. The single liquid oil includes: 60-80 parts by weight of an waterborne acrylic resin; 3-10 parts by weight of a metal pigment; 0.5-3 parts by weight of an auxiliary agent; 5-12 parts by weight of an organic solvent; and 15-25 parts by weight of water.

The invention also provides a method for fabricating a single liquid oil, comprising: (a) mixing and stirring a metal pigment, an organic solvent and water together to form a first mixture; (b) mixing and stirring an waterborne resin and an auxiliary agent together to form a second mixture; and (c) adding the first mixture into the second mixture to form the single liquid oil.

The invention yet provides a method for forming a thin film, comprising: providing a single liquid oil, wherein the single liquid oil comprises: 60-80 parts by weight of an waterborne resin; 3-10 parts by weight of a metal pigment; 0.5-3 parts by weight of an auxiliary agent; 5-12 parts by weight of an organic solvent; and 15-25 parts by weight of water; printing the single liquid oil on an article; and baking the article to form a thin film on the article.

A detailed description is given in the following embodiments with reference to the accompanying drawings.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The invention provides an oil and the method for fabricating the same. The oil may be printed on the border of the touch panel to form a thin film which not only has a metallic appearance but also has low conductivity.

The invention provides a single liquid oil which comprises: 60-80 parts by weight of an waterborne resin; 3-10 parts by weight of a metal pigment; 0.5-3 parts by weight of an auxiliary agent; 5-12 parts by weight of an organic solvent; and 15-25 parts by weight of water. The "single liquid oil" means that the oil is dried by baking without adding any curing agent thereto.

The waterborne resin comprises an waterborne acrylic resin or waterborne polyureane resin. Moreover, the waterborne resin has an average molecular weight of 100,000-250,000

The metal pigment comprises an aluminum pigment or copper pigment. The particle size of the metal pigment is about 9-15 m. In one embodiment, a commercial silver (Ag) paste may be used as the metal pigment, and the silver paste is formed by mixing 55-65% of the aluminum pigment and 45-35% of the alcohol solvent together.

The auxiliary agent comprises a slip and leveling agent, defoamer, dispersant, or tackifying agent. The slip and leveling agent is used to improve the flatness of the thin film made by the oil. The organic silicon-based material may be used as the slip and leveling agent. In one embodiment, the commercial product BYK 346 is used as the slip and leveling agent.

The defoamer is used to remove the air bubble in the thin film made by the oil. In one embodiment, the commercial product TEGO foamex 805 is used as the defoamer.

The dispersant is used to be mixed with each of the components of the oil, so that the components are mixed well enough, such that surface tension thereof is reduced. The acrylic acid copolymer may be used as the dispersant. In one embodiment, the commercial product BYK 192 may be used as the dispersant.

The tackifying agent is used to improve the viscosity of the oil. Commonly used tackifying agents comprise Acrylates/$C_{10-30}$ Alkyl Acrylate Crosspolymer, Cellulose Gum or Polyvinyl Alcohol.

The organic solvent comprises butyl glycol, butyl diethylene glycol, ethylene glycol monobutylether, dipropylene glycol butyl ether, propylene glycol phenyl ether or 2,2,4-trimethyl-1,3-pentanediol monoisobutyrate, etc.

Note that the organic solvent used in the invention has a high boiling point of about 210° C.-250° C. Additionally, the organic solvent also acts as the film-forming agent. Therefore, the film-forming rate of the oil is lower, and a more flat film is obtained.

Additionally, the invention also provides a method for fabricating the single liquid oil. The method comprises the steps (a)-(c). In step (a), the metal pigment, the organic solvent and water are mixed together and stirred for 20-40 minutes and kept for 4-8 hours to form a first mixture.

Then, in step (b), the waterborne resin and the auxiliary agent are mixed together and stirred for 20-40 minutes to form a second mixture. Note that the stirring rate of step (a) is lower than that of the step (b). Because the original structure (such as sheet structure) of the metal pigment may be destroyed by the stirring step, the step (a) is preferably stirred at a low rate. In one embodiment, the stirring rate of the step (a) is about 1-3 m/s, and the stirring rate of the step (b) is about 6-10 m/s.

Next, in step (c), the first mixture is added to the second mixture and well stirred for 20-40 minutes to form the single liquid oil.

Furthermore, the invention provides a method for forming a thin film. The method comprises the following steps. The single liquid oil formed by the above-mentioned method is printed on an article. Then, the article is baked at 50° C.-80° C. for 20-40 minutes to form a thin film on the article. The thin film has a thickness of about 10-30 μm, preferably 12-20 μm. The thin film not only has a metallic appearance but also low conductivity. The electrical conductivity of the thin film is about 30-200 mV, based upon detection by a Volt-Ohm-Milliammeter (the electrical conductivity requirements for the commercial electronic product must be less than 200 mV).

The article comprises the plastic shell of electronic products. The plastic material comprises acrylonitrile butadiene styrene (ABS), polystyrene (PS), polycarbonate (PC), polyvinylchloride (PVC), polycarbonate/acrylonitrile butadiene styrene (PC/ABS) Alloy, etc.

The baked temperature may be adjusted according to the material of the articles. In one embodiment, when the material of the articles is polycarbonate/acrylonitrile butadiene styrene (PC/ABS), the baked temperature is about 40° C.-60° C., preferably 50° C.-60° C. In another embodiment, the material of the articles is polystyrene (PS), so the baked temperature is about 65° C.-100° C., preferably 70° C.-80° C.

Note that the single liquid oil is mainly formed by the waterborne resin, and thus compared to the organic resin, the environmentally friendly single liquid oil is easier to fabricate. Additionally, compared with the double liquid oil, the single liquid oil is dried by a simpler baking step without adding any curing agent. Thus, process cost and time is reduced. The thin film formed by the single liquid oil of the invention not only has a metallic appearance but also low conductivity.

EXAMPLE

Example 1

The silver paste, butyl diethylene glycol, and water were mixed with a weight ratio of 1:1:1, stirred at room temperature for 30 minutes at 1-3 m/s rate, and kept for 4-8 hours to form a first mixture.

Then, 65 g of the waterborne resin, 0.2 g of the slip and leveling agent, and 0.8 g of the tackifying agent were stirred at room temperature for 30 minutes at a 6-10 m/s rate to form a second mixture. Next, the first mixture was slowly added into the second mixture and stirred for 30 minutes to form the single liquid oil.

The single liquid oil of Example 1 was printed on the plastic shell and baked at 60° C. for 30 minutes and kept for 48 hours to form a dry thin film with a thickness of about 12-20 μm. The electrical conductivity of the dried thin film of Example 1 was about 40 mV, as detected by a Volt-Ohm-Milliammeter.

Example 2

The silver paste, dipropylene glycol butyl ether, and water were mixed with a weight ratio of 1:1:1, stirred at room temperature for 30 minutes at 1-3 m/s rate, and kept for 4-8 hours to form a first mixture.

Then, 75 g of the waterborne resin, 0.3 g of the defoamer, and 0.5 g of the dispersant were stirred at room temperature for 30 minutes at a 6-10 m/s rate to form a second mixture.

Next, the first mixture was slowly added into the second mixture and stirred for 30 minutes to from the single liquid oil.

The single liquid oil of Example 2 was printed on the plastic shell and baked at 60° C. for 30 minutes and kept for 48 hours to form a dry thin film with a thickness of about 12-25 μm. The electrical conductivity of the dried thin film of Example 2 was about 50 mV, as detected by a Volt-Ohm-Milliammeter.

Example 3

The silver paste, dipropylene glycol butyl ether, and water were mixed with a weight ratio of 1:1:1, stirred at room temperature for 30 minutes at 1-3 m/s rate, and kept for 4-8 hours to form a first mixture.

Then, 80 g of the waterborne modified polyurane resin, 0.3 g of the slip and leveling agent, and 0.3 g of the defoamer were stirred at room temperature for 30 minutes at a 6-10 m/s rate to form a second mixture. Next, the first mixture was slowly added into the second mixture and stirred for 30 minutes to form the single liquid oil.

The single liquid oil of Example 3 was printed on the plastic shell and baked at 60° C. for 30 minutes and kept for 48 hours to form a dry thin film with a thickness of about 12-25 μm. The electrical conductivity of the dried thin film of Example 3 was about 35 mV, as detected by a Volt-Ohm-Milliammeter.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electrically conductive single liquid oil, comprising 60-80 parts by weight of an waterborne resin; 3-10 parts by weight of a metal pigment; 0.5-3 parts by weight of an auxiliary agent; 5-12 parts by weight of an organic solvent, wherein the organic solvent has a boiling point of 210° C.-250° C.; and 15-25 parts by weight of water, wherein said oil is electrically conductive and capable of forming a film having a conductivity of less than 200 mV.

2. An electrically conductive single liquid oil as claimed in claim 1, wherein the waterborne resin comprises an waterborne acrylic resin or waterborne polyureane resin.

3. An electrically conductive single liquid oil as claimed in claim 1, wherein the waterborne resin has an average molecular weight of 100,000-250,000.

4. An electrically conductive single liquid oil as claimed in claim 1, wherein the metal pigment comprises aluminum pigment or copper pigment.

5. An electrically conductive single liquid oil as claimed in claim 1, wherein the particle size of the metal pigment is about 9-15 μm.

6. An electrically conductive single liquid oil as claimed in claim 1, wherein the auxiliary agent comprises a slip and leveling agent, defoamer, dispersant, or tackifying agent.

7. An electrically conductive single liquid oil as claimed in claim 1, wherein the organic solvent comprises butyl glycol, butyl diethylene glycol, ethylene glycol monobutylether, dipropylene glycol butyl ether, propylene glycol phenyl ether or 2,2-4-trimethyl-1,3-pentanediol monoisobutyrate.

8. A method for fabricating an electrically conductive single liquid oil, comprising: (a) mixing and stirring a metal pigment, an organic solvent and water together to form a first mixture; (b) mixing and stirring an waterborne resin and an auxiliary agent together to form a second mixture; and (c) adding the first mixture into the second mixture to form the electrically conductive single liquid oil as set forth in claim 1.

9. The method for fabricating the electrically conductive single liquid oil as claimed in claim 8, wherein a stirring rate of step (a) is lower than that of step (b).

10. The method for fabricating the electrically conductive single liquid oil as claimed in claim 8, wherein the steps (a)-(c) are conducted at room temperature.

11. A method for forming a thin film, comprising: providing an electrically conductive single liquid oil as set forth in claim 1, wherein the single liquid oil comprises: 60-80 parts by weight of an waterborne resin; 3-10 parts by weight of a metal pigment; 0.5-3 parts by weight of an auxiliary agent; 5-12 parts by weight of an organic solvent, wherein the organic solvent has a boiling point of 210° C.-250° C.; and 15-25 parts by weight of water, wherein said oil is electrically conductive and capable of forming a film having a conductivity of less than 200 mV; printing the single liquid oil on an article; and baking the article to form a thin film on the article.

12. The method for forming the thin film as claimed in claim 11, wherein the thin film has an electrical conductivity of 30-200 mV.

13. The method for forming the thin film as claimed in claim 11, wherein the article comprises a plastic shell of electronic products.

14. The electrically conductive single liquid oil as claimed in claim 1, wherein the organic solvent is butyl diethylene glycol.

15. The electrically conductive single liquid oil as claimed in claim 1, wherein the metal pigment is a silver paste.

\* \* \* \* \*